US011321384B2

(12) United States Patent
Chen et al.

(10) Patent No.: US 11,321,384 B2
(45) Date of Patent: May 3, 2022

(54) METHOD AND SYSTEM FOR IDEOGRAM CHARACTER ANALYSIS

(71) Applicant: Open Text Corporation, Waterloo (CA)

(72) Inventors: Chao Chen, Shanghai (CN); Kunwu Huang, Shanghai (CN); Hongtao Dai, Shanghai (CN); Jingjing Liu, Shanghai (CN)

(73) Assignee: OPEN TEXT CORPORATION, Waterloo (CA)

( * ) Notice: Subject to any disclaimer, the term of this patent is extended or adjusted under 35 U.S.C. 154(b) by 1275 days.

(21) Appl. No.: 15/033,309

(22) PCT Filed: Sep. 30, 2015

(86) PCT No.: PCT/CN2015/091163
§ 371 (c)(1),
(2) Date: Apr. 29, 2016

(87) PCT Pub. No.: WO2017/054150
PCT Pub. Date: Apr. 6, 2017

(65) Prior Publication Data
US 2017/0262474 A1   Sep. 14, 2017

(51) Int. Cl.
*G06F 16/583* (2019.01)
*G06F 16/93* (2019.01)
(Continued)

(52) U.S. Cl.
CPC ...... *G06F 16/5846* (2019.01); *G06F 16/9038* (2019.01); *G06F 16/93* (2019.01);
(Continued)

(58) Field of Classification Search
CPC .. G06F 16/5846; G06F 16/93; G06F 16/9038; G06F 17/2223; G06F 17/24;
(Continued)

(56) References Cited

U.S. PATENT DOCUMENTS 9,262,486 B2 * 2/2016 Pfeifle ................. G06F 16/2468
10,402,490 B1 * 9/2019 Benavides ............ G06F 40/166
(Continued)

FOREIGN PATENT DOCUMENTS

| CN | 103927329 A | 7/2014 |
| CN | 104915264 A | 9/2015 |
| JP | 2011065597 A | * 3/2011 |

OTHER PUBLICATIONS

Google translation of JP2011065597A, "Device and data searching, and program", 2011 (Year: 2011).*

(Continued)

*Primary Examiner* — Mark D Featherstone
*Assistant Examiner* — Faezeh Forouharnejad
(74) *Attorney, Agent, or Firm* — Sprinkle IP Law Group

(57) ABSTRACT

Ideogram character analysis includes partitioning an original ideogram character into strokes, and mapping each stroke to a corresponding stroke identifier (id) to create an original stroke id sequence that includes stroke identifiers. A candidate ideogram character that has a candidate stroke id sequence within a threshold distance to the original stroke id sequence is selected. One or more embodiments may create a new phrase by replacing the original ideogram character with the candidate ideogram character in a search phrase. One or more embodiments perform a search using the search phrase and the new phrase to obtain a result, and present the result. One or more embodiments may replace an original ideogram character in a character recognized document with the candidate ideogram character and store the character recognized document.

32 Claims, 5 Drawing Sheets

(51) Int. Cl.
  *G06F 16/9038* (2019.01)
  *G06F 40/129* (2020.01)
  *G06F 40/166* (2020.01)
  *G06K 9/00* (2006.01)

(52) U.S. Cl.
  CPC .......... *G06F 40/129* (2020.01); *G06F 40/166* (2020.01); *G06K 9/00416* (2013.01); *G06K 2209/011* (2013.01)

(58) Field of Classification Search
  CPC . G06F 40/166; G06F 40/129; G06K 9/00416; G06K 2209/011
  See application file for complete search history.

(56) References Cited

U.S. PATENT DOCUMENTS

2011/0320481 A1* 12/2011 Huang ................ G06F 17/2223
  707/769
2014/0222416 A1  8/2014 Huang
2017/0060407 A1* 3/2017 Kanbe ................... G06K 9/222

OTHER PUBLICATIONS

International Preliminary Report on Patentability for corresponding International Application No. PCT/CN2015/091163, dated Apr. 12, 2018 (5 pages).
International Search Report for corresponding International Application No. PCT/CN2015/091163 dated May 27, 2016 (4 pages).
Written Opinon of the International Searching Authority for corresponding application PCT/CN2015/091163, dated May 27, 2016 (4 pages).
Extended European Search Report issued for European Patent Application No. 15905062.4 m dated Mar. 8, 2019, 7 pages.
Office Action issued for Chinese Patent Application No. 201580084629.1, dated Jun. 3, 2021,18 pages.

* cited by examiner

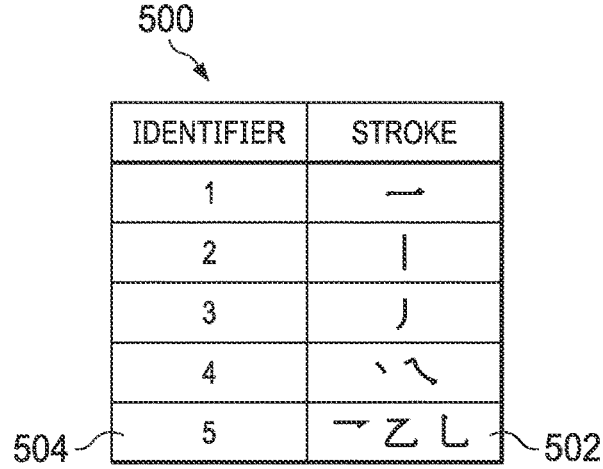
FIG. 5.1
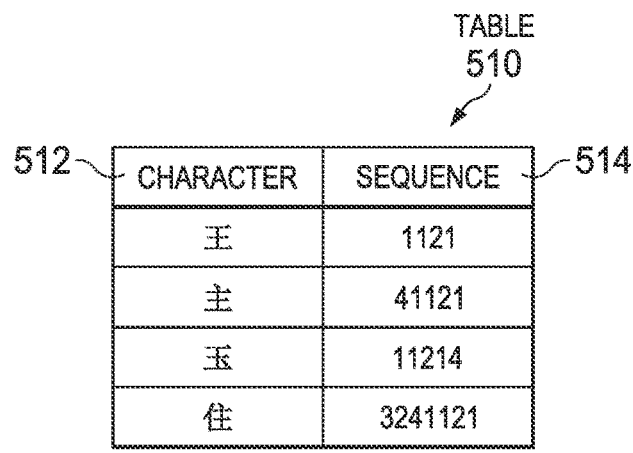
FIG. 5.2
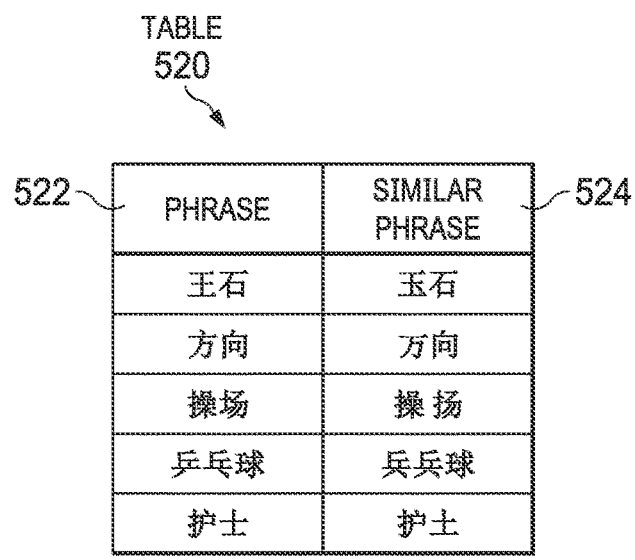
FIG. 5.3

METHOD AND SYSTEM FOR IDEOGRAM CHARACTER ANALYSIS

BACKGROUND

Optical character recognition (OCR) is the process of identifying characters from an image. In other words, OCR converts images of characters into machine-encoded characters. OCR may be performed, for example, when the incoming images are scanned images, or when a user is using a pointing device to handwrite character in an electronic device (e.g., using a stylus and a note taking software application). Because OCR is dependent on the clarity of the image, the clarity of the character and background, font and/or handwriting, and other factors, OCR may have challenges in correctly identifying characters.

SUMMARY

In general, in one aspect, one or more embodiments relate to a method and non-transitory computer readable medium for ideogram character analysis. Ideogram character analysis includes partitioning an original ideogram character into strokes, and mapping each stroke to a corresponding stroke identifier (id) to create an original stroke id sequence that includes stroke identifiers. A candidate ideogram character that has a candidate stroke id sequence within a threshold distance to the original stroke id sequence is selected, and a new phrase is created by replacing the original ideogram character with the candidate ideogram character in a search phrase. One or more embodiments perform a search using the search phrase and the new phrase to obtain a result, and present the result.

In general, in one aspect, one or more embodiments relate to a method for ideogram character analysis. The method includes partitioning an original ideogram character into strokes, mapping each stroke to a stroke id to create an original stroke id sequence including stroke identifiers. A candidate ideogram character that has a candidate stroke id sequence within a threshold distance to the original stroke id sequence is selected and replaces the original ideogram character in a character recognized document. The character recognized document is stored.

Other aspects of the technology will be apparent from the following description and the appended claims.

BRIEF DESCRIPTION OF THE DRAWINGS

FIGS. 5.1, 5.2, and 5.3 show an example in accordance with one or more embodiments of the technology.

DETAILED DESCRIPTION OF EMBODIMENTS

Figure 1:
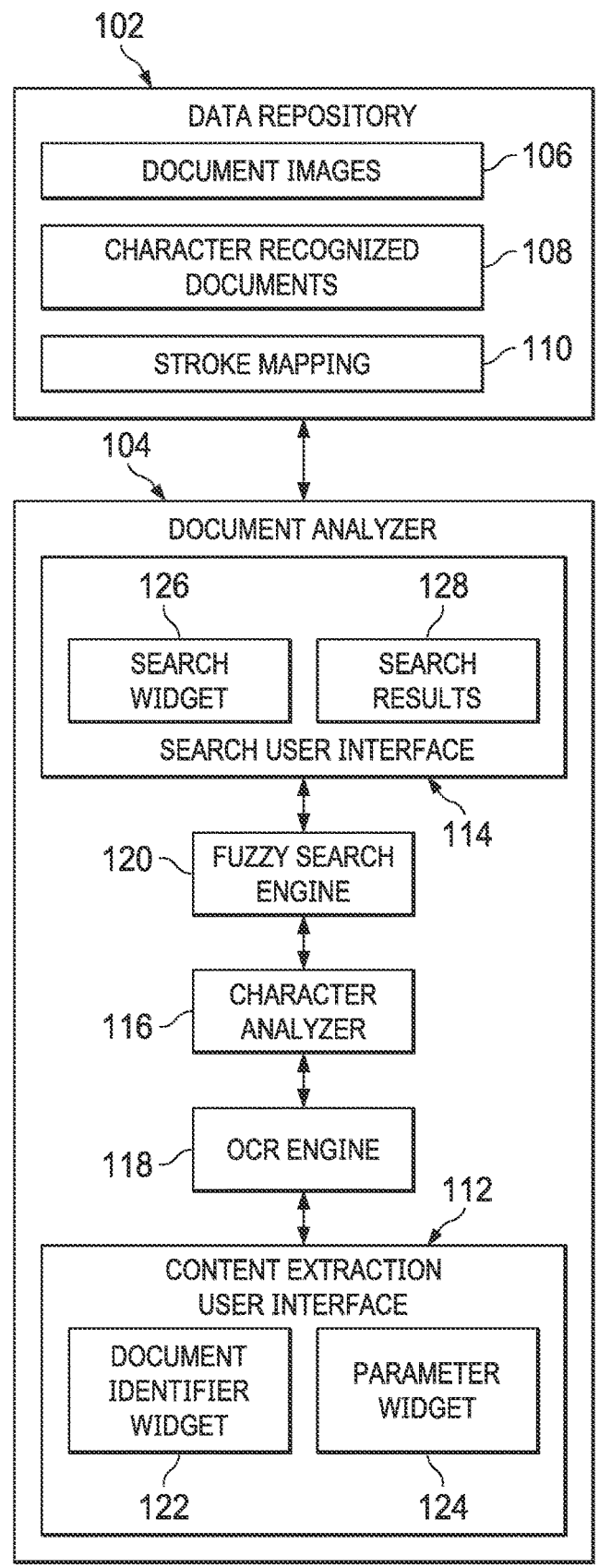
FIG. 1 shows a schematic diagram of a system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to performing ideogram character analysis. An ideogram character is a graphic symbol that represents an idea, without specifying pronunciation. Some ideogram characters may each represent an entire word. Some ideogram characters may represent parts of a word. Ideogram characters are graphemes in ideogram writing systems. Examples of ideogram writing systems include Chinese, Japanese kanji, and other languages. One or more embodiments are directed to partitioning an ideogram character into strokes, and translating the strokes into a stroke identifier (id) sequence. From the stroke id sequence, possible variations of the ideogram character may be determined. In one or more embodiments of the technology, the possible variations are used to correctly recognize the image form of the ideogram character while performing OCR. In one or more embodiments of the technology, the possible variations are used to perform a search for documents that have the original ideogram character incorrectly recognized via OCR.

FIG. 1 shows a schematic diagram of a system in accordance with one or more embodiments of the technology. The system shown in FIG. 1 may include and/or be executed on a computing system, such as the computing system shown in FIG. 6 and described below. As shown in FIG. 1, the system includes a data repository (102) and a document analyzer (104). Both of these components are described below.

In one or more embodiments of the technology, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site. The data repository (102) includes functionality to store document images (106), character recognized documents (108), and a stroke mapping (110).

In one or more embodiments of the technology, the document images (106) are images of documents that have at least some characters as image data. A document is a piece of work that is created using a software application. For example, a document may be created by an application for an image scanner, a camera application, a word processing application, a note application, or another software application. The piece of work may be saved in a computer file, a record, saved in temporary storage of the data repository, or otherwise stored. In one or more embodiments of the technology, the documents may be a character based document (e.g., free form invoice, receipt, article, book, or other such document), a form (e.g., an application, tax return, new account form, rebate form, or any other type of form), or any other type of document. Further, the document may have multiple parts, where each part is of a different type. For example, an article may be combined with an application form in a single document.

In one or more embodiments of the technology, at least a portion of the document is an image with ideogram characters. In other words, the document image has information, which is encoded in an image format rather than text format. In some embodiments, the entire document image (106) is an image. For example, the document images (106) may be computer generated images, pictures of documents, scanned documents, or other images of a document.

In one or more embodiments of the technology, character recognized documents (108) are documents in which optical character recognition (OCR) has been performed on the document images (106). Thus, the image data for at least some of the ideogram characters are replaced or supplemented in the character recognized document (108) with computer encoded characters. The computer encoded character is an encoding for text rather than image. For example, the computer encoded characters may be in Unicode, Guo Biao (GB) code, Guo Biao Kuozhan (GBK) code, Big 5 code, or other encodings. The character recognized documents may be stored in a searchable data repository. Further, some of the ideogram characters may be incorrectly recognized in the character recognized documents (108). In other words, a particular computer encoded character may be different than the original ideogram character in the document image. Such incorrect recognition may occur because of, for example, lack of clarity of the character in the document image, background of the character in the document image, lack of clarity in the font and/or handwriting, extraneous markings on the document image, and other factors.

In one or more embodiments of the technology, the data repository also includes functionality to store a stroke mapping (110). A stroke mapping (110) is a mapping between strokes of ideogram characters and a stroke identifier. In one or more embodiments of the technology, the strokes of an ideogram character do not include all strokes, but rather only a subset of strokes. In other embodiments, the stroke mapping (110) may include all strokes. In some embodiments, one or more strokes in the stroke mapping (110) may be a combination of strokes. In other words, rather than one stroke mapping to a stroke identifier, a combined set of strokes may map to a single stroke id defined for the combination. Thus, the stroke mapping (110) is a mapping of the steps to create the ideogram character. In other words, the stroke mapping (110) is not mapping to translate the ideogram character to a different language.

In one or more embodiments of the technology, the identifier for the stroke is a unique identifier amongst the strokes in the stroke mapping (110). For example, the unique identifier may be a numeric identifier, an alphabetic identifier, an alphanumeric identifier, or another identifier. Other identifiers may be used without departing from the scope of the technology.

Continuing with FIG. 1, the data repository (102) is connected to a document analyzer (104). In one or more embodiments of the technology, the document analyzer is hardware, software, firmware, or any combination thereof that includes functionality to identify variations of ideogram characters and perform operations on the ideogram characters. In one embodiments of the technology, the document analyzer (104) includes a content extraction user interface (112), search user interface (114), character analyzer (116), an OCR engine (118), and a fuzzy search engine (120). Each of these components is described below.

The content extraction user interface (112) is an interface for initiating the extraction of content from one or more document images (106). In other words, the content extraction user interface (112) is configured to receive parameters for performing OCR. The content extraction user interface (112) may include a document identifier widget (122) and a parameter widget (124). The document identifier widget (122) is a user interface widget for receiving identification of a document. For example, the document identifier widget (122) may be one or more of a check box, button, drop down box, a folder browsing interface, popup menu, a text box for submitting the name of the document image, an open pane in a window, a window that displays the document image, or another type of widget.

In one or more embodiments of the technology, the parameter widget (124) is a widget for receiving one or more parameters from a user that are used to recognize characters in the document. Multiple parameter widgets may exist. For example, the parameters may include the portion or portions of the document to extract content, the language of the content, any configuration on individual character extraction, other parameters, or any combination thereof. For example, a parameter widget (124) may be a drop-down menu, selection box, radio buttons, text box, or any other user interface widget or a combination thereof.

In one or more embodiments of the technology, the search user interface (114) is a user interface having a search widget (126) and receiving search results (128). The search widget (126) is any user interface widget that includes functionality to receive a search query. A search query is a query with keywords that a user submits to obtain documents satisfying the keywords. The documents searched in the search query may be character recognized documents (108). In one or more embodiments of the technology, the search query may include one or more ideogram characters. The search query may be structured, unstructured, or have some components structured and some unstructured. For example, a structured search query may be a key value pair, where each key identifies a particular attribute of the document and the value specifies the value of the attribute. An unstructured search query may be a set of one or more keywords (i.e., words, terms, phrases, characters) that are to be used in order to perform the search. Different types of search queries may be used herein without departing from the scope of the technology. In one or more embodiments of the technology, although not shown in FIG. 1, the search user interface (114) may include additional parameters, such as parameters to define the degree of fuzziness of the search. In other words, the degree of fuzziness may be the amount of variation between the ideogram character provided and the ideogram character searched.

In one or more embodiments of the technology, the search results (128) are results from the search. For example, the search results (128) may be document identifiers of matching documents, document locations of matching documents, the actual documents, other attributes of the matching documents, or any combination thereof. In one or more embodiments of the technology, the search results (128) may include or reference the character recognized documents. Alternatively or additionally, the search results (128) may include the document images that match the resulting character recognized documents that are identified by performing the search. Rather than or in addition to presenting the search results (128) in the search user interface (114), the document analyzer may be configured to store the search results.

Although FIG. 1 shows a schematic diagram for a system in which a user submits a search query, the search query may be submitted by another application. In such embodiments, in addition or as an alternative to the search user interface, the system may include an application programming interface that includes an interface for submitting search queries and configuring the search. The application programming interface may include an interface that returns and/or stores the results of the search using the search query.

In one or more embodiments of the technology, the character analyzer (116) includes functionality to analyze the ideogram characters and identify alternate ideogram characters. In one or more embodiments of the technology, the character analyzer (116) may operate at a phrase level. In other words, the character analyzer (116) may identify variations of an ideogram character based on surrounding context, whereby the surrounding context is a phrase having a collection of characters. For example, the phrase may be the entire word, a portion of a sentence, the sentence, or another surrounding set of characters. Analyzing ideogram characters and identifying alternate ideogram characters is described below and in FIGS. 2, 3, and 4.

In one or more embodiments of the technology, the OCR engine (118) includes functionality to perform OCR on a particular document. Performing OCR may include identifying portions of a document having characters, removing noise from the document, identifying, based on variation in color in the image and for each character, the portion of the document image corresponding to the character (character image) and the portion corresponding to background of the document, and matching the character image to the computer encoded character. In one or more embodiments of the technology, the OCR engine (118) may issue a call to or otherwise use the character analyzer (116) to identify variations of the identified character. For example, based on the variations, the OCR engine (118) may use the character analyzer to determine the most likely ideogram character matching the character image. Further, although not shown in FIG. 1, the character analyzer (116) may be a part of the OCR engine (118).

The fuzzy search engine (120) includes functionality to perform a fuzzy search based on a user search query. Different techniques may be used to perform the fuzzy search. For example, the fuzzy search may be performed by generating variations of the search query, such as by identifying variations of one or more characters in the search query, and removing characters from the search query. The fuzzy search may further be performed by searching for the original search query as well as the variations of the search query. In one or more embodiments of the technology, the fuzzy search engine (120) may issue a call to or otherwise use the character analyzer (116) to identify variations of one or more ideogram characters in the search query. For example, based on the variations, the fuzzy search engine (120) may perform additional searches to identify additional possible documents. The additional possible documents may be documents that have the ideogram character incorrectly recognized by the OCR engine. Further, although not shown in FIG. 1, the character analyzer (116) may be a part of the fuzzy search engine (120).

While FIG. 1 shows a configuration of components, other configurations may be used without departing from the scope of the technology. For example, various components may be combined to create a single component. As another example, the functionality performed by a single component may be performed by two or more components.

Figure 2:
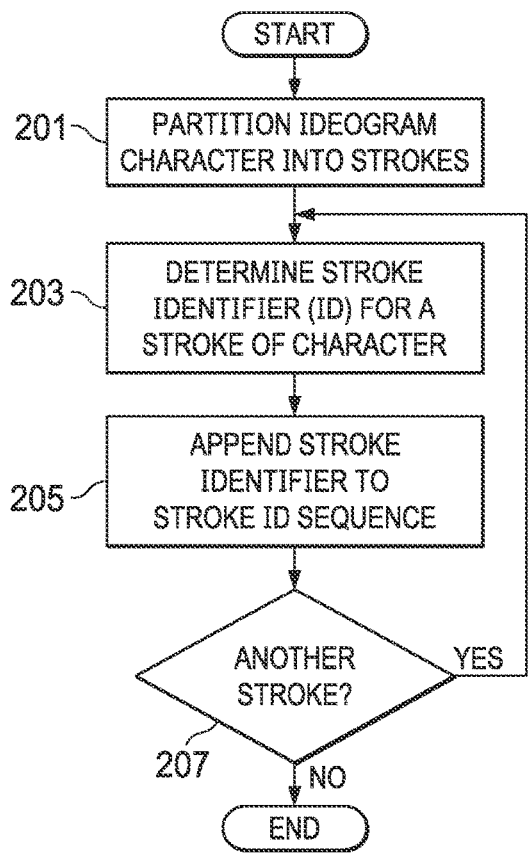
FIGS. 2, 3, and 4 show flowcharts in accordance with one or more embodiments of the technology.
Figure 3:
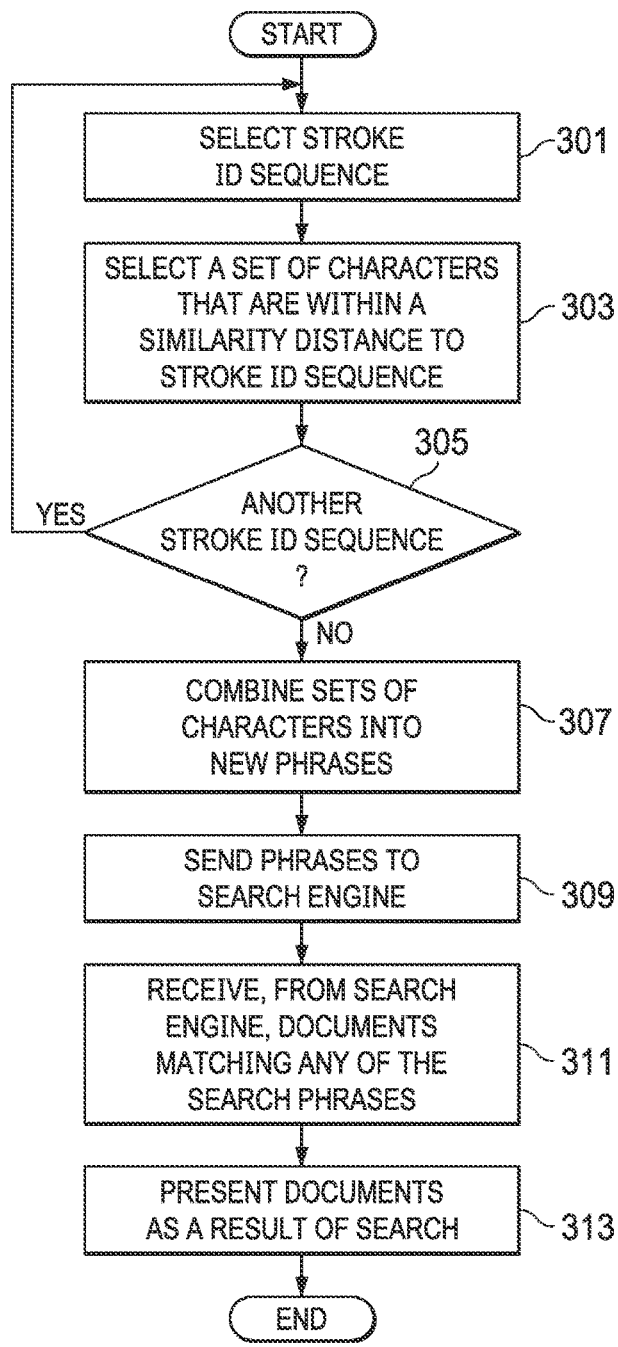
Figure 4:
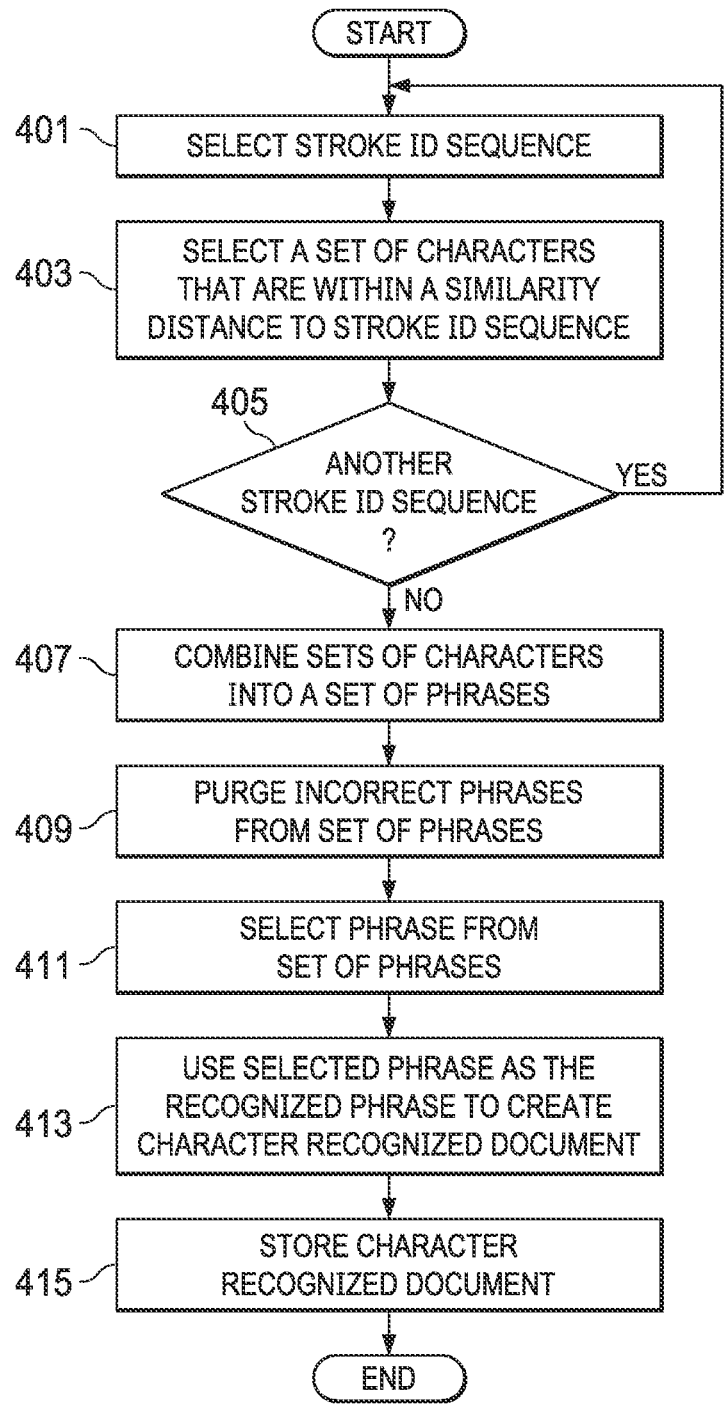

FIGS. 2, 3, and 4 show flowcharts in accordance with one or more embodiments of the technology. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 2 shows a flowchart for creating a stroke id sequence in accordance with one or more embodiments of the technology. The steps of FIG. 2 may be performed, for example, by the character analyzer in FIG. 1. In one or more embodiments of the technology, when FIG. 2 is performed for a character, an original ideogram character has been identified. In other words, the ideogram character may be received via user interface, and thus, already a computer encoded character. By way of another example, the computer encoded character may be received from the OCR engine after the OCR engine performs an initial determination of the computer encoded character corresponding to the image version of the character. For example, the OCR engine may select the initial computer encoded character from a character image based on pattern matching.

In Step 201, an ideogram character is partitioned into strokes in accordance with one or more embodiments of the technology. In one or more embodiments of the technology, partitioning the character into strokes may be performed as follows. For each stroke in the stroke mapping at least until a partition is found, a determination is made whether the stroke is in the character. In other words, a determination is made whether overlaying the stroke on the character results in the stroke being encompassed by the character. If the stroke is encompassed by the character, then the stroke is in the character. If the stroke is not in the character, then the next stroke in the stroke mapping is identified and a determination is made whether the next stroke is in the character. Determining whether each stroke is in the character may be performed until a partition is found. A partition is found when the character is covered by the strokes or no more unprocessed strokes are in the stroke mapping in accordance with one or more embodiments of the technology. In one or more embodiments of the technology, the strokes in the stroke mapping are ordered. The ordering creates a determinable partitioning of the character into strokes. Namely, for each character, a single partition exists that is for all instances of the character in accordance with one or more embodiments of the technology. Further, in accordance with one or more embodiments of the technology, the ordering may also create a single order of strokes in the stroke identifier sequence as described below. In one or more embodiments of the technology, the order may be, for example, based on size and encapsulation. For example, a stroke that has two bends may be of greater precedence in the order than a stroke with a single bend. A stroke with a single bend may have greater precedence than a stroke with no bends. Thus, strokes with two bends may be analyzed before strokes with single bends, which are analyzed prior to strokes with no bends.

Step 201 may continually be processed until the character is partitioned into strokes. During processing or after partitioning, the flow may proceed to Step 203 to create the stroke identifier sequence. In other words, in some embodiments, as a stroke is identified, the flow may proceed to Step 203 to add the stroke to the stroke id sequence. Alternatively, the flow may proceed to Step 203 after all strokes are identified.

In Step 203, the stroke identifier is determined for the stroke of the character in accordance with one or more embodiments of the technology. As discussed above, the stroke identifier corresponds to a stroke that is in the character. Stroke identifiers are identified in order of the mapping in accordance with one or more embodiments of the technology.

In Step 205, the stroke id is appended to the stroke id sequence in accordance with one or more embodiments of the technology. In one or more embodiments of the technology, the stroke identifier is added to the end of the stroke id sequence. Thus, for example, the identifier of the first stroke starts the sequence. The next stroke identified is added to the end of the sequence to create a new end of sequence, and so forth.

In Step 207, a determination is made whether another stroke exists in accordance with one or more embodiments of the technology. If another stroke exists, the flow proceeds back to Step 203 to obtain the stroke identifier for the next stroke in the partition. If another stroke does not exist, then the flow may proceed to end.

FIG. 2 is only one example set of steps for partitioning an ideogram character into strokes and adding the stroke identifiers to a stroke id sequence. Other steps and/or ordering of steps may be used without departing from the scope of the technology.

FIG. 3 shows a flowchart for performing a fuzzy search using variations of an ideogram character in accordance with one or more embodiments of the technology. The steps of FIG. 3 may be performed, for example, by the character analyzer and the fuzzy search engine in FIG. 1.

FIG. 3 may be initiated by a user submitting keywords for a search, where the keywords include ideogram characters. The keywords may be submitted directly into the search user interface via the search widget. In other words, the search widget may receive the keywords in as computer encoded text for ideogram characters. In some embodiments, the user submits a name of a document to the search widget and requests a search for similar documents. In such a scenario, the submitted document may have some ideogram characters in image format. If some characters are in image format, OCR recognition may be performed and the computer encoded characters may be identified. The OCR recognition for the ideogram characters may include performing the Steps described in FIG. 4 below. Regardless of the instigator to the search, FIG. 4 describes a flowchart for processing an original phrase having an original set of one or more ideogram characters. The use of the term, "original", refers to the phrase being the phrase provided by the user or the output of the OCR processing. Each original ideogram character in the Set may have FIG. 2 performed on the character in order to create a stroke id sequence for the character.

In Step 301, a stroke id sequence is selected in accordance with one or more embodiments of the technology. The selected stroke id sequence corresponds to an ideogram character in the set of original ideogram characters. In one or more embodiments, stroke id sequences for the ideogram characters may be processed in virtually any order.

In Step 303, a set of candidate ideogram characters that are within a similarity distance to the stroke id sequence of the original ideogram character is identified. Identifying the set of characters may be performed as follows. In one or more embodiments of the technology, the similarity distance may be based, for example, on the edit distance of the candidate ideogram character's stroke id sequence from the original character's stroke id sequence. In other words, given two strings X and Y on the set of possible stroke identifiers, the edit distance d(X, Y) is the minimum-weight series of edit operations that transforms X into Y. Single edits may be to insert, delete, or substitute a stroke identifier. Insertion of a single stroke identifier is to add a stroke identifier to any position in the stroke id sequence. Deletion is to remove a stroke identifier from any position in the stroke id sequence. Substitution is to substitute a stroke identifier in the original stroke id sequence with a new stroke identifier.

For example, consider the scenario in which ten strokes exist having stroke identifiers 0, 1, 2, 3, 4, 5, 6, 7, 8, and 9. In the example, if X=36, then inserting the stroke identifier 5 may produce 356, which is a candidate stroke id sequence Y. As another example, if X=1368, then deletion of 8 creates Y=136. By way of an example of substitution, if X=2459, then substitution of 2 for 1 yields stroke id sequence Y=1459. Each of the example candidate stroke id sequences have an edit distance of 1 to the original stroke id sequence.

The example candidate stroke id sequences may be mapped back to candidate ideogram characters. In other words, the candidate ideogram characters are the ideogram characters that correspond to the candidate stroke id sequences. For any candidate character that is not part of the ideogram language, the character may be discarded. In other words, if a candidate stroke id sequence does not map back to a real character, then the stroke id sequence is discarded.

In one or more embodiments, the number of candidate ideogram characters may be limited by, for example, edit distance and/or by number of candidate ideogram characters. For example, the original stroke id sequence may be changed a single time using insertion, substitution, or deletion to create a candidate stroke id sequence having an edit distance of one. Similarly, in the example, the original stroke id sequence may be changed twice using insertion, substitution, and/or deletion to create a candidate stroke id sequence having an edit distance of two. The process may continue until N edits are made to the original stroke id sequence, where N is the maximum edit distance. In one or more embodiments of the technology, the maximum edit distance N may be configured by the user, set as a system default, or otherwise configured. Each candidate stroke id sequence may be mapped back to the corresponding candidate ideogram characters, whereby ideogram characters that do not exist in the language are discarded. From the remaining characters, the first M ideogram characters having the smallest corresponding edit distance are selected, where M is the maximum number of candidate ideogram characters considered.

In Step 305, a determination is made whether another stroke id sequence exists in accordance with one or more embodiments of the technology. In other words, a determination is made whether another original ideogram character exists in the original phrase that is not processed in accordance with one or more embodiments of the technology. If another unprocessed ideogram character exists, the flow proceeds to Step 301 to identify another set of candidate characters.

If another unprocessed ideogram character does not exist, the flow proceeds to Step 307 to combine sets of candidate and original ideogram characters into new phrases. In one or more embodiments of the technology, the ideogram characters are maintained in the same order in the new phrases as in the original phrase. In other words, an original ideogram character in the original phrase is replaced with its candidate ideogram characters to create candidate phrases, where the candidates remain in the same position as the original ideogram character. The number of ideogram characters replaced in the original phrase to obtain a new phrase may be configurable in accordance with one or more embodiments of the technology. For example, the number of characters may be one, two, or three characters in accordance with one or more embodiments of the technology.

In Step 309, the candidate phrases and the original phrases are sent to the search engine in accordance with one or more embodiments of the technology. The search engine searches the character recognized documents to identify the set of documents having the original phrase and/or the candidate phrase. In other words, standard searching of the character recognized documents may be performed to identify documents having any of the search phrases. Thus, documents having incorrect OCR recognition may be identified and retrieved.

In Step 311, from the search engine, documents matching any of the search phrases are identified. In other words, the search engine may return a list of document identifiers of matching documents.

In one or more embodiments of the technology, the results may be ordered based on the degree of variation between the original phrase and the candidate phrase. For example, the more characters replaced, the less relevant the result may be. As another example, the greater the edit distance for one or more candidate ideogram characters to the corresponding original ideogram characters, the less relevant the result. Additional techniques for ordering the results may be used, such as based on whether the candidate or original phrase is in exactly the same order in a document, whether all the characters in the phrase exist in the document, and other criteria.

In Step 313, the documents are presented as the result of the search in accordance with one or more embodiments of the technology. For example, the list of documents may be presented in order to the user, such as displayed in the graphical user interface on a display device. By way of another example, the list of documents may be stored, so that a user and/or software application may perform additional processing on the documents. In one or more embodiments of the technology, the returned documents may be the character recognized documents or the document images corresponding to the character recognized documents.

For example, consider the scenario in which a user, who does business with China, scans multiple receipts and invoices for goods and services that the user purchased from China into the user's computer. As the user scans the multiple receipts and invoices, OCR is performed on the receipts and invoices to create a catalog. The OCR is performed as a background process that is hidden to the user. Some of the Chinese characters, which are ideogram characters, are incorrectly recognized by the OCR engine. However, because the OCR is a background process, the user is not aware of the incorrect recognition. Later, the user wants to find any document having to do with a user's purchase of a computer. Thus, the user submits the two Chinese characters for the word "computer" as keywords into the search widget. For each of the two Chinese characters, the system creates original stroke id sequences for both of the two original characters. The system then identifies candidate stroke id sequences to identify candidate characters having slightly varying strokes. The system next may create candidate phrases from the candidate characters. The original Chinese phrase for computer and the candidate phrases are used to search the user's collection of receipts and invoices. In other words, the character recognized documents are searched to identify not only the character recognized documents that correctly have the Chinese word for computer, but also to identify character recognized documents that should have had the Chinese word for computer, but do not because of incorrect OCR. The document identifiers of each document in the search results is identified and used to obtain the matching document images. The matching document images are returned to the user. Thus, the user may obtain the correct set of documents from a search, even though the documents had incorrect OCR performed. As shown in the example, one or more embodiments provide a mechanism for a machine to search documents that have had incorrect OCR performed.

FIG. 4 shows a flowchart for performing OCR recognition in accordance with one or more embodiments of the technology. In other words, FIG. 4 shows a flowchart for correcting an incorrect OCR. The steps of FIG. 4 may be performed, for example, by the character analyzer, and the OCR engine in accordance with one or more embodiments of the technology. The Steps of FIG. 4 may be performed based on the OCR engine performing OCR on a document. FIG. 4 may be performed separately for each set of ideogram characters, whereby a set of ideogram characters correspond to a word, phrase, or sentence in the document. In some embodiments, the Steps of FIG. 4 are performed for all sets of ideogram characters. In other embodiments, the Steps of FIG. 4 are only performed for the sets of ideogram characters that are grammatically incorrect in the computer encoded format. For example, if, after performing OCR, the OCR engine determines that certain sets of ideogram characters are misspelled, contextually incorrect, or otherwise do not fit the document, the OCR engine may trigger the Steps of FIG. 4 for the identified sets of ideogram characters. Alternatively, the Steps of FIG. 4 may be performed for all sets of ideogram characters as part of the OCR process.

In Step 401, a stroke id sequence is selected. In Step 403, the set of characters that are within a similarity distance to the stroke id sequence are identified. In Step 405, a determination is made whether another stroke id sequence exists for the set of ideogram characters. If another stroke id sequence exists, the flow may proceed to Step 401. If another unprocessed stroke id sequence does not exist, the flow may proceed to Step 407. In Step 407, the set of ideogram characters are combined into a set of phrases in accordance with one or more embodiments of the technology. Steps 401, 403, 405, and 407 of FIG. 4 may be performed in a same or similar manner as Steps 301, 303, 305, and 307, respectively, of FIG. 3 as discussed above.

Continuing with FIG. 4, in Step 409, incorrect phrases are purged from the set of phrases in accordance with one or more embodiments of the technology. In other words, the system may make an assumption that the original document image does not have grammatical mistakes, including ideogram characters that contextually do not make sense in the document. Thus, any candidate or original phrases that are grammatically incorrect are removed.

In Step 411, a phrase is selected from the set of phrases in accordance with one or more embodiments of the technology. As discussed in reference to FIG. 3, candidate phrases may be ordered according to edit distance. In other words, summing the edit distance of the stroke id sequences across the ideogram characters from the original phrase to the candidate phrase may be used to create a candidate phrase edit distance. The candidate phrase edit distances may be ordered to identify the candidate phrase having the least number of edits from the original. The candidate phrase having the least number of edits that remains after the purging in Step 409 may be the selected phrase in Step 411.

In Step 413, the selected phrase is used as the recognized phrase to create the character recognized document in accordance with one or more embodiments of the technology. In other words, the selected phrase may replace the phrase image of the original phrase, may be added as metadata, set as the content extracted from the image for the phrase, or otherwise used as being the result of the OCR performed for the phrase image of the original phrase.

In Step 415, the character recognized document is stored in accordance with one or more embodiments of the technology. The character recognized document may be stored, temporarily or permanently in the data repository. Thus, content may be extracted from the character recognized document.

One or more embodiments may allow a machine to correct incorrect OCR when the document includes ideogram characters. In particular, although a user using a document image may quickly identify the proper ideogram character, noise in the document image and other factors may prohibit a machine from correctly recognizing the document. One or more embodiments may be used to correct the document by a machine identifying variations of the ideogram characters that are different by only a few strokes.

FIGS. 5.1, 5.2, and 5.3 show examples in accordance with one or more embodiments of the technology. The examples shown in FIGS. 5.1, 5.2, and 5.3 are for explanatory purposes only and not intended to limit the scope of the technology.

FIG. 5.1 shows an example of a stroke mapping (500) in accordance with one or more embodiments of the technology. In the example, each row corresponds to an individual stroke. The number of sub-strokes in the stroke may vary according to the particular stroke mapping. Thus, although stroke (502) has multiple sub-strokes, stroke (502) is mapped to a single stroke id of 5 (504).

FIG. 5.2 shows an example ideogram table (510) showing ideogram characters (512) and the matching stroke identifier sequence (514) in accordance with one or more embodiments of the technology. As shown in FIG. 5.2 each ideogram character is partitioned into component strokes form the stroke mapping in FIG. 5.1. The stroke id from the stroke mapping for a component stroke is identified and added to the stroke id sequence for the character. Thus, each character has a corresponding stroke id sequence.

FIG. 5.3 shows an example table (520) of phrases (522) and similar phrases (524) in accordance with one or more embodiments of the technology. In other words, the phrase (522) may correspond to the original phrase and the similar phrases (524) may correspond to the candidate phrases. As shown, the differences between the phrase (522) and the candidate phrase (524) may be small, such as a single bar in a character. However, a great difference in meaning may exist because of the small change. One or more embodiments may provide a technique for recognizing the variation and using the variation to counteract incorrect OCR processing.

Figure 6:
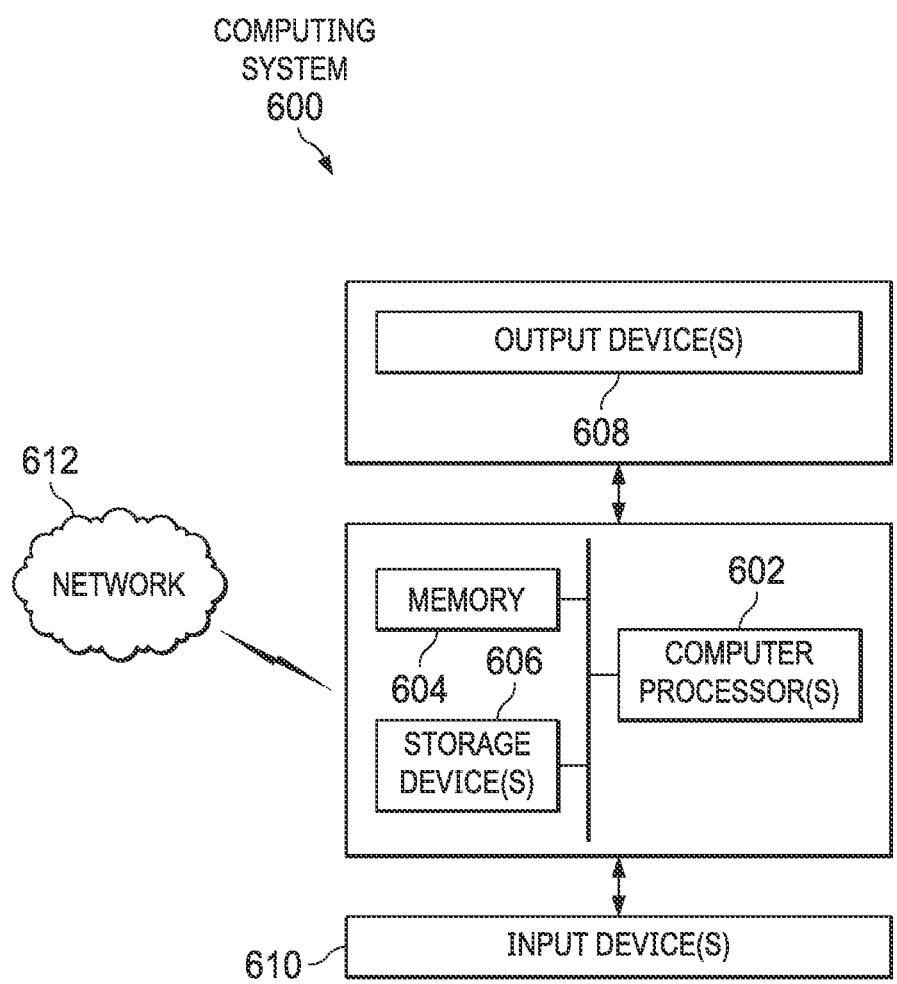
FIG. 6 shows a computing system in accordance with one or more embodiments of the technology.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

The invention claimed is:

1. A method for ideogram character analysis, the method comprising:
receiving a search phrase for searching a set of character recognized documents in a repository, the search phrase including an original ideogram character;
partitioning the original ideogram character from the search phrase into a plurality of strokes;
mapping each stroke of the plurality of strokes to a corresponding stroke identifier (id) to create an original stroke id sequence comprising a plurality of stroke identifiers;
selecting a candidate ideogram character that has a candidate stroke id sequence within a threshold distance to the original stroke id sequence, the selecting the candidate ideogram character comprising:
creating a set of candidate stroke id sequences by modifying the original stroke id sequence using a number of edits based on the threshold distance;
discarding from the set of candidate stroke id sequences any candidate stroke id sequence that does not map to a corresponding ideogram character of an ideogram language to determine a set of remaining candidate stroke id sequences; and
identifying a set of replacement ideogram characters based on corresponding edit distances of the set of remaining candidate stroke id sequences to the original stroke id sequence;
creating new phrases, creating the new phrases comprising replacing the original ideogram character with each replacement ideogram character from the set of replacement ideogram characters in the search phrase;
performing a search of the set of character recognized documents using the search phrase and the new phrases to obtain a result identifying any documents in the set of character recognized documents that match the search phrase and any documents in the set of character recognized documents that match the new phrases; and
presenting the result.

2. The method of claim 1, wherein performing the search comprises:
querying a data repository with the search phrase and the new phrases to obtain a plurality of documents,
wherein the result comprises a plurality of document identifiers of the plurality of documents.

3. The method of claim 1, wherein the plurality of stroke identifiers is a plurality of numbers.

4. The method of claim 1, wherein selecting the candidate ideogram character comprises:
inserting a stroke id into the original stroke id sequence to create the candidate stroke id sequence;
identifying the candidate ideogram character from the candidate stroke id sequence.

5. The method of claim 4, wherein the stroke id is inserted into a plurality of positions to create a plurality of stroke id sequences comprising the candidate stroke id sequence, and wherein the search is performed using a plurality of ideogram characters corresponding to the plurality of stroke id sequences.

6. The method of claim 1, wherein selecting the candidate ideogram character comprises:
deleting a stroke id from the original stroke id sequence to create the candidate stroke id sequence;
identifying the candidate ideogram character from the candidate stroke id sequence.

7. The method of claim 1, wherein selecting the candidate ideogram character comprises:

replacing an original stroke id in the original stroke id sequence with a candidate stroke id to create the candidate stroke id sequence;
identifying the candidate ideogram character from the candidate stroke id sequence.

8. The method of claim 7, wherein the plurality of stroke identifiers in the original stroke id sequence are replaced to create a plurality of stroke id sequences comprising the candidate stroke id sequence, and wherein the search is performed using a plurality of ideogram characters corresponding to the plurality of stroke id sequences.

9. A method for ideogram character analysis, the method comprising:
accessing a result of an (OCR) performed on a document image, the result including an original phrase that includes an original ideogram character recognized from the document image;
partitioning the original ideogram character into a plurality of strokes;
mapping each stroke of the plurality of strokes to a corresponding stroke identifier (id) to create an original stroke id sequence comprising a plurality of stroke identifiers;
selecting a candidate ideogram character that has a candidate stroke id sequence within a threshold distance to the original stroke id sequence, the selecting the candidate ideogram character further comprising:
creating a set of candidate stroke id sequences by modifying the original stroke id sequence using a number of edits based on the threshold distance;
discarding from the set of candidate stroke id sequences any candidate stroke id sequence that does not map to a corresponding ideogram character of an ideogram language to determine a set of remaining candidate stroke id sequences; and
identifying a set of replacement ideogram characters based on corresponding edit distances of the set of remaining candidate stroke id sequences to the original stroke id sequence, the set of replacement ideogram characters including the candidate ideogram character;
generate a set of new phrases, generating the set of new phrases comprising replacing the original ideogram character with each replacement ideogram character from the set of replacement ideogram characters;
purge any incorrect phrases from the set of new phrases to create a set of remaining phrases;
select a replacement phrase from the set of remaining phrases and replace the original phrase with the remaining phrase in a character recognized document; and
storing the character recognized document including the replacement phrase with the candidate ideogram character in a searchable data repository in association with a document identifier usable to retrieve the document image.

10. The method of claim 9, wherein the plurality of stroke identifiers is a plurality of numbers.

11. The method of claim 9, wherein selecting the candidate ideogram character comprises:
inserting a stroke id into the original stroke id sequence to create the candidate stroke id sequence;
identifying the candidate ideogram character from the candidate stroke id sequence.

12. The method of claim 11, wherein the stroke id is inserted into a plurality of positions to create a plurality of stroke id sequences comprising the candidate stroke id sequence, and wherein the method further comprises:

purging, from a plurality of ideogram characters corresponding to the plurality of stroke id sequences, a contextually incorrect subset of the plurality of ideogram characters to obtain a remaining subset, wherein the candidate ideogram character is selected from the remaining subset.

13. The method of claim 9, wherein selecting the candidate ideogram character comprises:

deleting a stroke id from the original stroke id sequence to create the candidate stroke id sequence;

identifying the candidate ideogram character from the candidate stroke id sequence.

14. The method of claim 9, wherein selecting the candidate ideogram character comprises:

replacing an original stroke id in the original stroke id sequence with a candidate stroke id to create the candidate stroke id sequence;

identifying the candidate ideogram character from the candidate stroke id sequence.

15. The method of claim 14, wherein the plurality of stroke identifiers in the original stroke id sequence are replaced to create a plurality of stroke id sequences comprising the candidate stroke id sequence, and wherein the method further comprises:

purging, from a plurality of ideogram characters corresponding to the plurality of stroke id sequences, a contextually incorrect subset of the plurality of ideogram characters to obtain a remaining subset, wherein the candidate ideogram character is selected from the remaining subset.

16. A non-transitory computer readable medium for ideogram character analysis, the non-transitory computer readable medium comprising computer readable program code for:

receiving a search phrase for searching a set of character recognized documents in a repository, the search phrase including an original ideogram character, partitioning the original ideogram character from the search phrase into a plurality of strokes;

mapping each stroke of the plurality of strokes to a corresponding stroke identifier (id) to create an original stroke id sequence comprising a plurality of stroke identifiers;

selecting a candidate ideogram character that has a candidate stroke id sequence within a threshold distance to the original stroke id sequence, the selecting the candidate ideogram character comprising:

creating a set of candidate stroke id sequences by modifying the original stroke id sequence using a number of edits based on the threshold distance;

discarding from the set of candidate stroke id sequences any candidate stroke id sequence that does not map to a corresponding ideogram character of an ideogram language to determine a set of remaining candidate stroke id sequences; and identifying a set of replacement ideogram characters based on corresponding edit distances the set of candidate stroke id sequences from the original ideogram character;

creating new phrases, creating the new phrases comprising replacing the original ideogram character with each replacement ideogram character from the set of replacement ideogram characters in the search phrase;

performing a search of a set of character recognized documents using the search phrase and the new phrases to obtain a result identifying any documents in the set of character recognized documents that match the search phrase and any documents in the set of character recognized documents that match the new phrase; and presenting the result.

17. The non-transitory computer readable medium of claim 16, wherein performing the search comprises:

querying a data repository with the search phrase and the new phrases to obtain a plurality of documents, wherein the result comprises a plurality of document identifiers of the plurality of documents.

18. The non-transitory computer readable medium of claim 16, wherein selecting the candidate ideogram character comprises:

inserting a stroke id into the original stroke id sequence to create the candidate stroke id sequence;

identifying the candidate ideogram character from the candidate stroke id sequence.

19. The non-transitory computer readable medium of claim 16, wherein selecting the candidate ideogram character comprises:

deleting a stroke id from the original stroke id sequence to create the candidate stroke id sequence;

identifying the candidate ideogram character from the candidate stroke id sequence.

20. The non-transitory computer readable medium of claim 16, wherein selecting the candidate ideogram character comprises:

replacing an original stroke id in the original stroke id sequence with a candidate stroke id to create the candidate stroke id sequence;

identifying the candidate ideogram character from the candidate stroke id sequence.

21. The method of claim 1, wherein discarding from the set of candidate stroke id sequences any candidate stroke id sequence that does not map to a corresponding ideogram character comprises comparing each candidate stroke id sequence from the set of candidate stroke id sequences to a reference set of ideogram characters.

22. The method of claim 21, wherein the reference set of ideogram characters comprises stroke id sequences for the ideogram characters in the reference set of ideogram characters.

23. The method of claim 1, wherein the set of candidate stroke id sequences includes the candidate stroke id sequence of the candidate ideogram character and wherein each candidate stroke id sequence in the set of candidate stroke id sequences is within the threshold distance of the original stroke id sequence.

24. The method of claim 1, wherein identifying the replacement ideogram character comprises:

identifying a set of candidate ideogram characters from the set of candidate stroke id sequences using a mapping of ideogram characters to corresponding stroke id sequences; and identifying the candidate ideogram character from the set of candidate ideogram characters as the replacement ideogram character based on the candidate stroke id sequence of the candidate ideogram character having a smallest corresponding edit distance from the original stroke id sequence.

25. The method of claim 9, wherein discarding from the set of candidate stroke id sequences any candidate stroke id sequence that does not map to a corresponding ideogram character comprises comparing each candidate stroke id sequence from the set of candidate stroke id sequences to a reference set of ideogram characters.

26. The method of claim 25, wherein the reference set of ideogram characters comprises stroke id sequences for the ideogram characters in the reference set of ideogram characters.

27. The method of claim 9, wherein the set of candidate stroke id sequences includes the candidate stroke id sequence of the candidate ideogram character and wherein each candidate stroke id sequence in the set of candidate stroke id sequences is within the threshold distance of the original stroke id sequence.

28. The method of claim 9, wherein identifying the replacement ideogram character comprises:
- identifying a set of candidate ideogram characters from the set of candidate stroke id sequences using a mapping of ideogram characters to corresponding stroke id sequences; and
- identifying the candidate ideogram character from the set of candidate ideogram characters as the replacement ideogram character based on the candidate stroke id sequence of the candidate ideogram character having a smallest corresponding edit distance from the original stroke id sequence.

29. The non-transitory computer readable medium of claim 16, wherein discarding from the set of candidate stroke id sequences any candidate stroke id sequence that does not map to a corresponding ideogram character comprises comparing each candidate stroke id sequence from the set of candidate stroke id sequences to a reference set of ideogram characters.

30. The non-transitory computer readable medium of claim 29, wherein the reference set of ideogram characters comprises stroke id sequences for the ideogram characters in the reference set of ideogram characters.

31. The non-transitory computer readable medium of claim 16, wherein the set of candidate stroke id sequences includes the candidate stroke id sequence of the candidate ideogram character and wherein each candidate stroke id sequence in the set of candidate stroke id sequences is within the threshold distance of the original stroke id sequence.

32. The non-transitory computer readable medium of claim 16, wherein identifying the replacement ideogram character comprises:
- identifying a set of candidate ideogram characters from the set of candidate stroke id sequences using a mapping of ideogram characters to corresponding stroke id sequences; and
- identifying the candidate ideogram character from the set of candidate ideogram characters as the replacement ideogram character based on the candidate stroke id sequence of the candidate ideogram character having a smallest corresponding edit distance from the original stroke id sequence.

* * * * *